(12) United States Patent
Kernert et al.

(10) Patent No.: US 10,061,748 B2
(45) Date of Patent: Aug. 28, 2018

(54) ADAPTIVE TILE MATRIX REPRESENTATION AND MULTIPLICATION

(71) Applicant: SAP SE, Walldorf (DE)

(72) Inventors: David Kernert, Heidelberg (DE); Wolfgang Lehner, Dresden (DE); Frank Koehler, Heidelberg (DE)

(73) Assignee: SAP SE, Walldorf (DE)

(*) Notice: Subject to any disclaimer, the term of this patent is extended or adjusted under 35 U.S.C. 154(b) by 238 days.

(21) Appl. No.: 14/966,860

(22) Filed: Dec. 11, 2015

(65) Prior Publication Data
US 2017/0168990 A1 Jun. 15, 2017

(51) Int. Cl.
*G06F 17/16* (2006.01)
(52) U.S. Cl.
CPC .................................. *G06F 17/16* (2013.01)
(58) Field of Classification Search
None
See application file for complete search history.

(56) References Cited

U.S. PATENT DOCUMENTS

| 9,489,176 | B2* | 11/2016 | Haugen | G06F 17/16 |
| 2006/0224562 | A1* | 10/2006 | Yan | G06F 17/30536 |
| 2015/0193431 | A1* | 7/2015 | Stoytchev | G06F 19/18 |
| | | | | 704/9 |

* cited by examiner

*Primary Examiner* — Michael D Yaary
(74) *Attorney, Agent, or Firm* — Buckley, Maschoff & Talwalkar LLC

(57) ABSTRACT

According to some embodiments, matrix A data may be loaded into a temporary, unordered starting representation that contains coordinates and values for each element of matrix A. Z-curve ordering of matrix A may be performed to create a two-dimensional density map of matrix A by counting matrix elements that are contained in logical two-dimensional block cells of a given size. A quad-tree recursion may be executed on the two-dimensional density map structure in reduced Z-space to identify areas of different densities in the two dimensional matrix space. An adaptive tile matrix representation of input matrix A may then be created. According to some embodiments, an adaptive tile matrix multiplication operation may perform dynamic tile-granular optimization based on density estimates and a cost model.

13 Claims, 12 Drawing Sheets

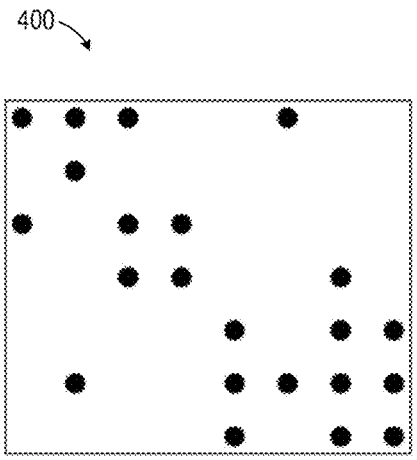
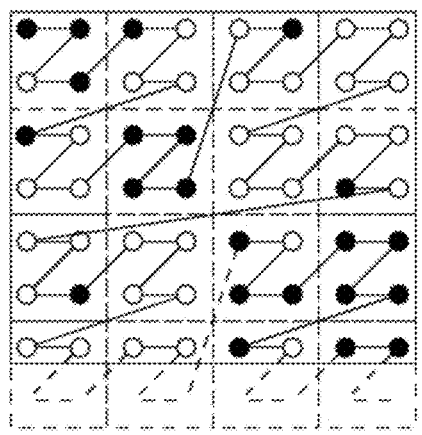
FIG. 4A
FIG. 4B
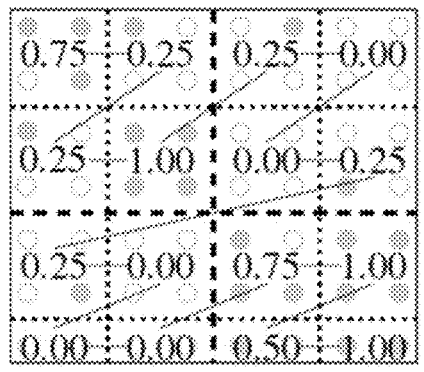
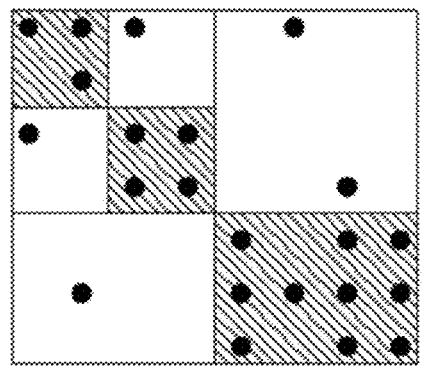
FIG. 4C
FIG. 4D

Algorithm 1 Recursive Quadtree Partitioning

1: function RECQTPART(ZMatrix $Src$, $ZBlockCnts[]$, AT MATRICES $Tgt$, $zStart$, $zEnd$)
2:    $range \leftarrow zEnd - zStart$
3:    if $range == 0$ then
4:       if $ZBlockCnts[zStart] == -1$ then
5:          return $(OUT\_OF\_BOUNDS, 0)$
6:       else
7:          $\rho \leftarrow$ CALCDENSITY($ZBlockCnts[zStart]$)
8:          return $(FORWARD, \rho)$
9:    else
10:       $stride \leftarrow (zEnd - zStart + 1)/4$
11:       $UL \leftarrow$ RECQTPART($Src, ZBlockCnts[], Tgt,$ $zStart, zStart + stride$)
12:       $UR \leftarrow$ RECQTPART($Src, ZBlockCnts[], Tgt,$ $zStart + stride, zStart + 2 \cdot stride$)
13:       $LL \leftarrow$ RECQTPART($Src, ZBlockCnts[], Tgt,$ $zStart + 2 \cdot stride, zStart + 3 \cdot stride$)
14:       $LR \leftarrow$ RECQTPART($Src, ZBlockCnts[], Tgt,$ $zStart + 3 \cdot stride, zStart + 4 \cdot stride$)
15:       if $UL, UR, LL, LR$ homogeneous and $range < MAXSIZE$ then
16:          return ($FORWARD$, AVG($UL, UR, LL, LR$))
17:       else
18:          return ($MATERIALIZED$, MATERIALIZETILES($UL, UR, LL, LR, \rho_0$))

Algorithm 2 Sequential version of ATMULT

1: function ATMULT(AT MATRICES $A, B, C$)
2:     $\hat{\rho}_C \leftarrow$ ESTIMATEDENSITY($\hat{\rho}_A, \hat{\rho}_B$)
3:     $\rho_D \leftarrow \min\{\rho_D, \text{WATERLVLMETHOD}(\hat{\rho}_C, MEMLIMIT)\}$ 4:     for all tile-rows $ti$ in $A$ do
5:         for all tile-cols $tj$ in $B$ do
6:             $C_{ti,tj} \leftarrow ((\hat{\rho}_C)_{ti,tj} \geq \rho_D$ ? $DenseTile$ : $SparseTile$)
7:             for all matching tiles $k$ in $A_{ti}$ and $B_{tj}$ do
8:                 $w \leftarrow$ CALCULATEREFWINDOW($A_{ti,k}, B_{k,tj}$)
9:                 $A'_{ti,k}, B'_{k,tj} \leftarrow$ OPTIMIZE($A_{ti,k}, B_{k,tj}, C_{ti,tj}$)
10:                TILEMULTIPLY($A'_{ti,k}, B'_{k,tj}, C_{ti,tj}, w$)

FIG. 7

ADAPTIVE TILE MATRIX REPRESENTATION AND MULTIPLICATION

FIELD

Some embodiments are associated with an adaptive tile matrix representation and/or a multiplication operation for such a matrix. In particular, some embodiments describe topology-aware optimization of big sparse matrices and matrix multiplications on, for example, a main-memory system.

BACKGROUND

The data sizes associated with analytical applications continuously increase, and many data scientists are switching from customized micro-solutions to scalable alternatives (e.g., statistical and scientific databases). However, many data mining algorithms may be expressed in terms of linear algebra, which is barely supported by major database vendors and big data solutions. Moreover, conventional linear algebra algorithms and legacy matrix representations are often not suitable for very large matrices.

Recently, big data matrices have appeared in many analytical applications of science and business domains. These include solving linear systems, principal component analysis, clustering and similarity-based applications, such as non-negative matrix factorization in gene clustering, as well as algorithms on large graphs (e.g., multi-source breadth-first-search). A very common—and often substantially expensive—operation that is involved in all of the aforementioned applications is matrix multiplication, where at least one matrix is usually large and sparse. As an example, consider a similarity query associated with text mining: a term-document matrix $(A)_{ij}$ that contains the frequency of terms j for every document i is multiplied with its transpose to obtain the cosine similarity matrix of documents $D=AA^T$. Similarly, in gene clustering, the core computation contains iterative multiplications of the large, sparse gene expression matrix V with a dense matrix $H^T$.

Such applications used to be custom-coded by data analysts in solutions on a small scale, often using numerical frameworks like R or Matlab. However, the growth of data volume, and the increasing complexity of modern hardware architectures, has driven scientists to shift from handcrafted implementations to scalable alternatives, such as massively parallel frameworks and database systems. While frameworks like R or Matlab may provide a suitable language environment to develop mathematical algorithms, such implementations are not out-of-the-box scalable. As a consequence, a scalable system that provides a basic set of efficient linear algebra primitives may be desirable. Some systems may provide a R (or R-like) interface and deep integrations of linear algebra primitives, such as sparse matrix-matrix and matrix-vector multiplications. Further note that with the decrease in Random Access Memory ("RAM") prizes, and the corresponding scale up in main memory systems, it has become feasible to run basic linear algebra algorithms directly on big data sets that reside in an in-memory column store. However, for most frameworks and libraries the user is required to predefine the final data structure of a matrix. Furthermore, matrices may be stored as a whole in either a sparse, or a dense static format, resulting in poor memory utilization and processing performance when the data representation is not chosen wisely.

BRIEF DESCRIPTION OF THE DRAWINGS

FIGS. 4A through 4D are a schematic illustration of a quad-tree partitioning using a spares 7×8 matrix and a 2×2 block granularity in accordance with some embodiments.

FIG. 5 is a recursive quad-tree algorithm according to some embodiments.

FIG. 7 is a sequential version of an adaptive tile matrix multiplication operation algorithm in accordance with some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Some embodiments described herein provide a strategy for large matrix processing on modern multicore systems that is based on a novel, adaptive tile matrix representation. According to some embodiments, multiple techniques inspired from database technology may be utilized, such as multidimensional data partitioning, cardinality estimation, indexing, dynamic rewrites, and/or other techniques may be used in order to improve execution time. Moreover, an adaptive tile matrix multiplication operator may improve performance as compared to alternative approaches.

Figure 1:
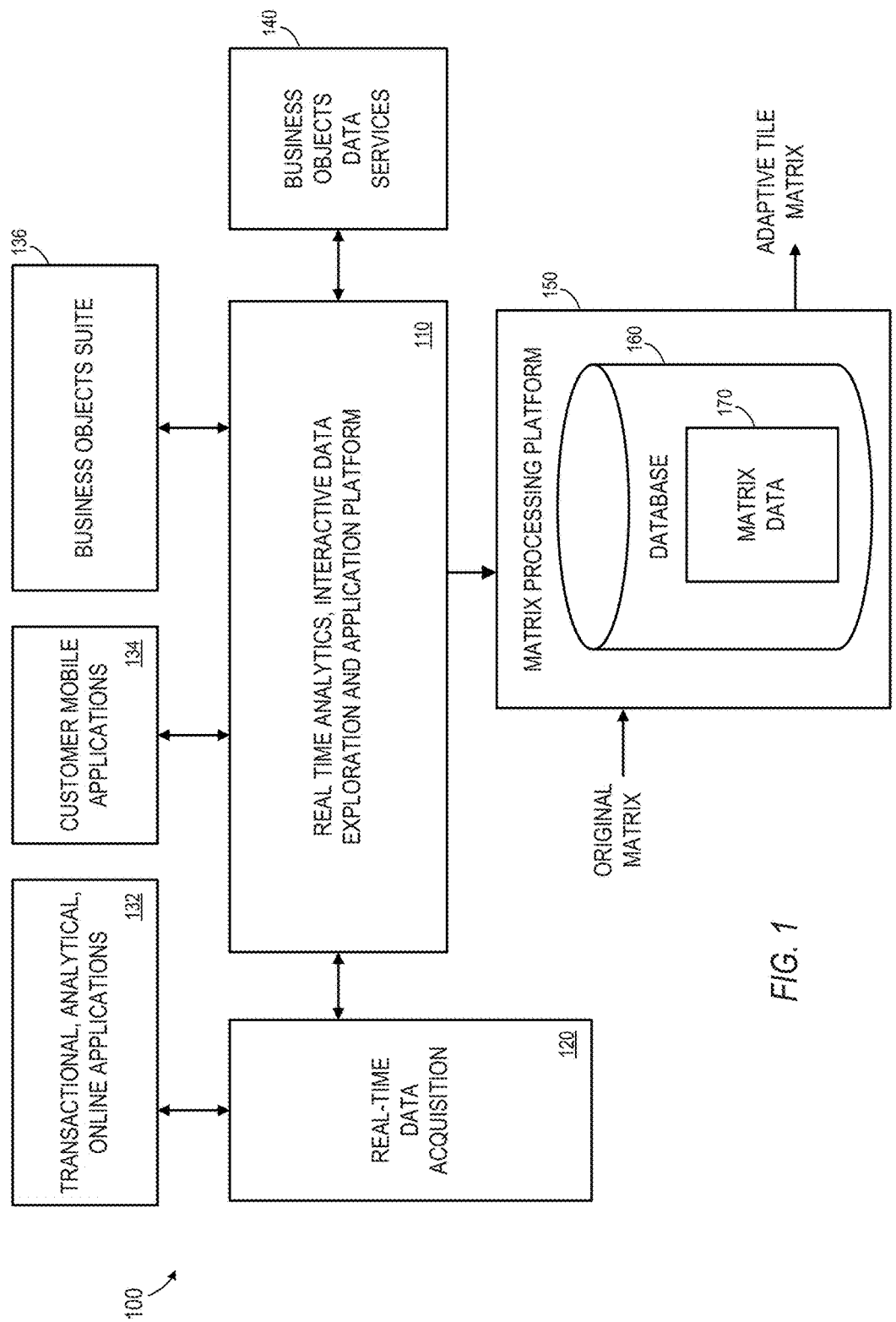
FIG. 1 is a block diagram of a computer system including an adaptive tile matrix platform.

In some cases, a computer system may include applications that are released and able to run on various combinations of database systems, Operating Systems ("OSs"), virtualization layers and cloud services, such as Infra-Structure As A Service ("IaaS") implementations. By way of example, only FIG. 1 is a block diagram of a computer system 100 including a real time analytics, interactive data exploration and application platform 110 that communicates with a real-time data acquisition device 120. The application platform 110 might be associated with, for example, the High-performance ANalytic Appliance ("HANA") in-memory, column-oriented, relational database management system developed and marketed by SAP SE®. The application platform 110 may include, for example, an OnLine Analytical Processing ("OLAP") engine, a predictive engine, a spatial engine, application logic, and/or a rendering platform. The real-time data acquisition device 120 may include landscape transformation, a replication server, and/or an event stream processor. According to some embodiments, the application platform 110 and/or real-time data acquisition device 120 may exchange information with transactional, analytical, online applications 132. The application platform may also exchange information with customer mobile applications 134 (e.g., associated with mobile platforms), a business object suite 136 (e.g., associated with exploration, reporting, dashboarding, predictive functions, and/or mobile versions) and/or business objects data services 140.

Various infrastructure components of the system 100 may be instrumented and monitored to help keep business processes up and running. Moreover, any of the elements of FIG. 1 may be associated with big data and/or in-memory representations of data. A matrix processing platform 150 may receive information from the real time analytics, interactive data exploration and application platform 110 and an original matrix (e.g., by an input stream or a CSV file import), manipulate matrix data 170 in a database 160 and output an adaptive tile matrix in accordance with any of the embodiments described herein. According to some embodiments, multiple techniques inspired from database technology may be utilized, such as multi-dimensional data partitioning, cardinality estimation, indexing, dynamic rewrites, and/or other techniques, in order to improve execution time. Moreover, an adaptive tile matrix multiplication operator may improve performance as compared to alternative approaches.

Some embodiments described herein may provide a solution that reduces the burden on data scientists to choose appropriate data structures and/or algorithms for large matrix problems. Embodiments may provide systems and methods to store and process very large and sparse matrices on multicore main-memory platforms, which may automatically improve the data layout based on matrix topology. To accelerate multiplication some embodiments may use optimization techniques—e.g. just-in-time data conversions—that are inspired from relational query processing. As will be described, embodiments utilize an "adaptive tile matrix" data structure, and in some cases a shared-memory parallel adaptive tile matrix multiplication operator, to: provide a hybrid adaptive tile matrix representation consisting of tiles that have variable sizes and variable physical storage layouts to store large sparse and dense matrices of any individual non-zero pattern efficiently; provide a time- and space-efficient adaptive tile matrix multiplication operator that performs dynamic tile-granular optimizations based on density estimates and a sophisticated cost model; and/or utilize several methods based on database technologies, such as 2D indexing, cardinality estimation, and/or join optimization.

Some embodiments described herein may address the problem of selecting an appropriate data representation for large sparse matrices. Typically, a matrix representation is chosen in accordance with the used algorithms, which often have distinct data access patterns. For this reason, many algorithms are specifically written for a certain data representation. As a consequence, choosing the right data structure can have a significant impact on processing performance. Naturally, the selection of data representations and algorithms should depend on matrix characteristics, such as the matrix density. However, a widely used, crude separation between plain dense and plain sparse matrices may not match the particularities of real world matrices. Their non-zero patterns are usually non-uniform and contain distinct regions of higher and lower densities. Therefore, an adaptive, heterogeneous data representation may accommodate individual dense or sparse substructures for matrices of any nature.

Note that relatively "dense" matrices are usually stored in plain C++ arrays, or blocks of arrays, which does not leave a lot of room for optimization. However, the remaining degree of freedom is the linearization of the two-dimensional array, which can be either in row major or column major order. The order usually coincides with the algorithm access pattern. Many tuned implementations of linear algebra algorithms process dense matrices in a block-wise manner, which lessens the impact of linearization and yield good cache re-usage. Algorithms and in-place updates on dense matrices are significantly more efficient than on sparse matrix representations, due to the simple layout and direct index accessibility in both column and row dimensions. Thus, performance-wise it can be promising to spend a bit more memory and use a dense array instead of a sparse representation.

Figure 2:
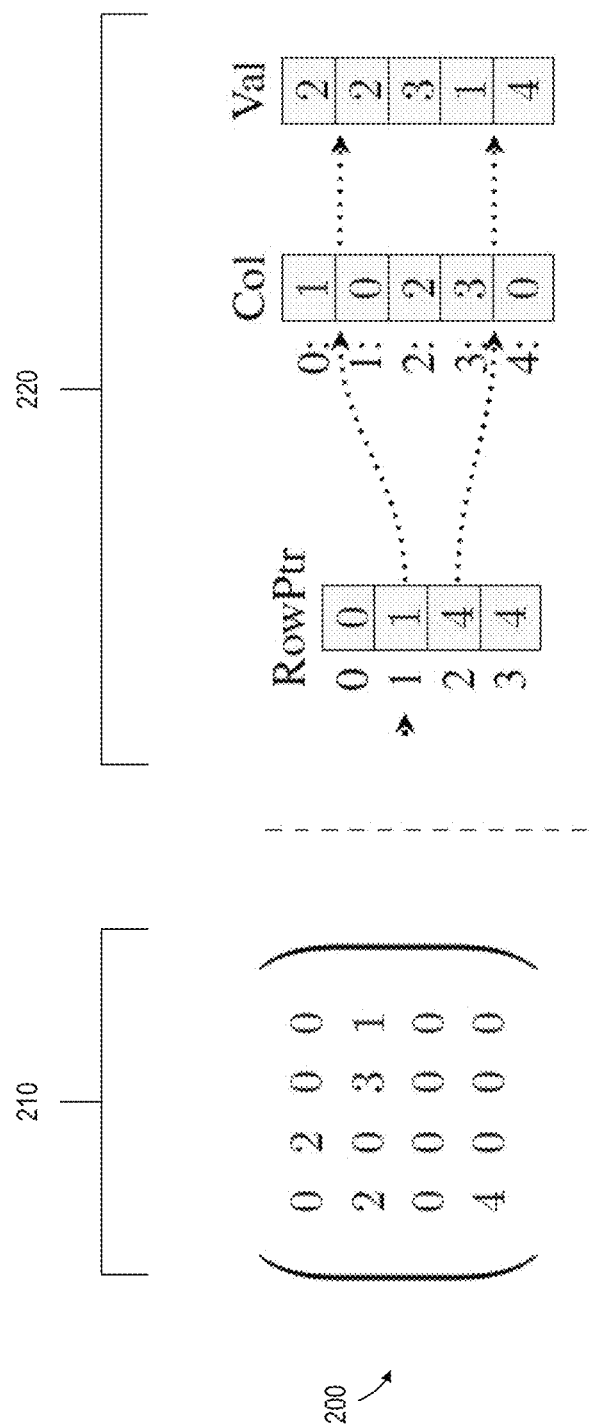
FIG. 2 is an example of a compressed sparse row format for a matrix.

Also note that, in contrast to dense matrices, dozens of different data representations are commonly used for relatively "sparse" matrices. Many representations of sparse matrix structures in numeric linear algebra are well designed for distinct non-zero patterns, such as band or diagonal-dominated matrices, but are poorly suited for general, rather uniformly populated matrices. Widely used for storing sparse matrices is the Compressed Sparse Row ("CSR") format, also referred to as Compressed Row Storage ("CRS"). For example, FIG. 2 is an example 200 of a CSR format 220 for an input matrix 210. This format 220 may be, for example, efficient for arithmetic operations, row slicing, and matrix-vector products. Moreover, CSR-based algorithms tend to perform sparse matrix vector multiplications efficiently.

Although the above mentioned data structures and corresponding algorithms are widely used even for very large matrices, they might not scale well on multicore machines. Some reasons why include: (1) Without detailed knowledge about the data and the corresponding non-zero pattern, it is unlikely that a user will pick the best data structure for a sparse matrix with respect to algorithm performance. (2) When scaling the aforementioned data structures to arbitrary sizes, some algorithms, such as the sparse matrix-matrix multiplication, tend to show a bad normalized runtime performance. This can be explained with the decreased cache locality due to large matrix dimensions. (3) Large sparse matrices often have a topology with distinct areas of a significantly higher density. Using dense subarrays may reveal a significant optimization opportunity by exploiting efficient dense multiplication kernels.

Due to the poor scaling behavior of naive sparse data representations, and the performance improvements that adhere when using dense algorithms for dense subparts of matrices, some embodiments described herein provide two major design choices for an adaptive tile matrix structure: (1) for a better cache locality of dense and sparse algorithms, each matrix may be tiled with a variable tile size; and (2) tiles with a high population density are stored as a dense array, while tiles of a lower density have a CSR representation. The tile storage representation may be chosen according to a density threshold value that minimizes the runtime costs of the algorithm under consideration, such as matrix multiplication.

Note that as used herein there is a difference between matrix "tiles" and logical "blocks." Tiles can have arbitrary sizes, and define the bounding box of the physical representation that accommodates the corresponding part of the matrix. In contrast, a logical block is atomic and only refers to a square area of the fixed minimum block size $b_{atomic} \times b_{atomic}$, which is equal to the minimum size of a matrix tile.

In particular, this means that a physical matrix tile can never be smaller than a logical block, but could potentially span a region of multiple logical blocks. The tiles are adaptive, and the size is chosen such that an adaptive tile matrix tile covers the greatest possible matrix part of either a low or a high population density, without exceeding the maximum tile size.

For dense tiles, a maximum tile size $b_{max}^d \times b_{max}^d$ may be fixed and chosen such that $\alpha$ tiles can fit within the Last Level Cache ("LLC") of an underlying system. A parameter $\alpha \geq 3$ might reasonably preserve the cache locality for binary algorithms like a tiled matrix-matrix multiplication. For sparse tiles, there may be two upper bounds for the tile size. The first upper bound may be based on a memory size such that a sparse tile with density $\rho$ does not occupy more than $$\frac{1}{\alpha}$$

of the LLC size. The second upper bound may be a bit more subtle and may be dimension-based, i.e. chosen such that at least $\beta$ 1D-arrays with the length of one tile-width can fit within the LLC, which is motivated by the width of accumulator arrays used in sparse matrix multiplication kernels. Hence, the system-dependent maximum block sizes might be calculated as:

$$b_{max}^d = \sqrt{\frac{LLC}{\alpha d_D}}$$

$$b_{max}^{sp} = \min\left\{\sqrt{\frac{LLC}{\alpha d_D}}, \frac{LLC}{\beta S_d}\right\}$$

with $S_{d/sp}$ referring to the size in bytes of a matrix element in the sparse/dense representation. By way of example only, $\alpha = \beta = 3$ might assure that at least three matrix tiles fit in the LLC at the same time. Naturally, cache locality may also depend on concurrency, as well as on the data and respective thread distribution on non-uniform memory access sockets. Hence, the ideal tile size and values of $\alpha$, $\beta$ might deviate from the heuristic selection described herein (leaving room for further tuning).

The minimum size of matrix tiles, which were introduced as logical block size, defines the granularity of the adaptive tile matrix. The selection of the granularity is generally trade-off between overhead and optimization opportunity: the finer grained the tiles are, the higher the administrative cost of the adaptive tile matrix, whereas very coarse grained tiles might not be able to resolve the heterogeneous substructure of a matrix. However, atomic blocks that are too small not only result in a higher overhead of any algorithm dealing with the partitioned adaptive tile matrix structure, but also increase the recursion depth of the initial partitioning algorithm described herein (e.g., in connection with FIG. 5). The latter also requires that the dimensions of atomic blocks are a power of two, i.e. $b_{atomic} = 2^k$. Naturally, k may be adapted to the system configuration, since the optimal minimum tile size can depend on hardware parameters (e.g., cache size). For a system with a LLC of 24 MB, embodiments might utilize k=10, which yields $b_{atomic} = 1024$, and is equal to the maximum dense tile size $b_{max}^d$.

Figure 3A:
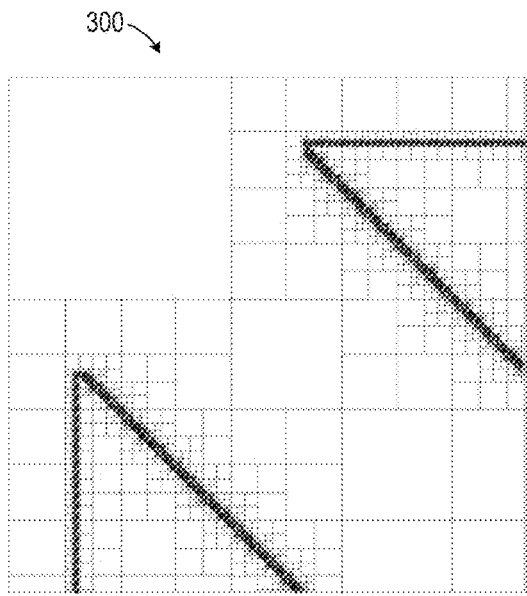
FIGS. 3A and 3B show a sample matrix represented as an adaptive tile matrix using two different granularities.
Figure 3B:
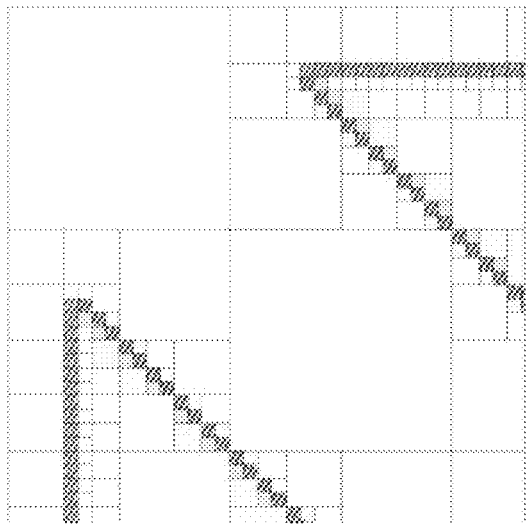
Figure 3C:
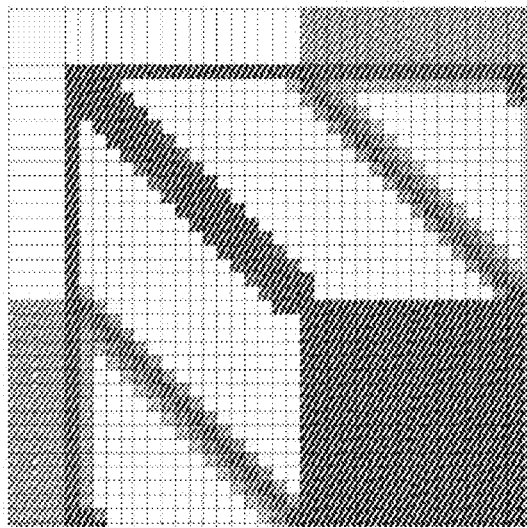
FIG. 3C shows the density estimation of the sample matrix.
Figure 3D:
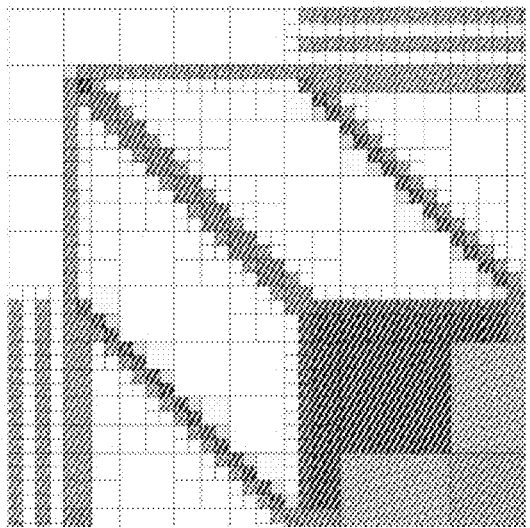
FIG. 3D shows the actual result of an adaptive tile multiplication in accordance with some embodiments.

FIGS. 3A and 3B show 300 a sample matrix represented as an adaptive tile matrix using two different granularities. In particular, FIG. 3A uses $b_{atomic} = 64$ and k=6 while FIG. 3B uses $b_{atomic} = 1024$ and k=10. FIG. 3C shows the density estimation of the sample matrix, and FIG. 3D shows the actual result of an adaptive tile multiplication in accordance with some embodiments. Note that heterogeneous tiling may yield a significant performance gain by using different multiplication kernels, which is exploited by the adaptive tile multiplier operator described herein. The multiplication result matrix in FIG. 3D also shows a sub-structure with distinct sparse and dense regions, underlining the motivation for a topology-aware matrix data type.

Unlike the adaptive tile matrix approach, a naive matrix tiling with fixed block size, as it is done in some implementations, often results in adding overhead without any positive impact on the runtime performance. This is true in particular for hyper-sparse matrices, and when blocks are badly dimensioned and barely contain any elements. Therefore, sparse tiles may be adaptive: the tile size depends on the number of non-zero elements, and grows until the maximum tile size is hit as of equation for $b_{max}^{sp}$. As a consequence, sparse, and in particular large, hyper-sparse matrices without notable dense sub-regions are not split (as long as they do not exceed a certain dimension threshold). Assuming an LLC of size 24 MB, then the dimension threshold calculates as $b_{max}^{sp} = 1$ million. Hence, a sparse matrix with dimensions of 500,000×500,000 and a homogeneous density of $\rho = N_{nz}/(n^2) = 10^{-5}$ would still be stored in a single, sparse tile, thus, no additional overhead is added by the adaptive tile matrix structure. As a result, embodiments described herein may be equally well suited for dense, sparse, or hyper-sparse matrices, by adding a tile substructure only if it is beneficial for later processing.

A recursive partitioning method may identify regions of different density and sizes in the matrix topology, and create the corresponding matrix tiles in the adaptive tile matrix representation. This process can be divided into the components loading, reordering, identifying, and materialization, and is illustrated 400 in FIGS. 4A through 4D for an exemplary small, sparse matrix. In particular, the illustration 400 is a schematic representation of a quad-tree partitioning using a sparse 7×8 matrix and a 2×2 block granularity. FIG. 4A represents a raw input matrix A, FIG. 4B represents Z-curve ordering of matrix A and logical atomic blocks, FIG. 4C represents a density map of matrix A in the reduced two dimensional space, and FIG. 4D represents the final adaptive tile matrix after quad-tree recursion.

According to some embodiments, an adaptive tile matrix is created using locality-aware element reordering. For example, matrix data may be initially loaded into a temporary, unordered staging representation, which is simply a table of the matrix tuples—containing the coordinates and values of each matrix element. In order to identify areas of different densities in the two-dimensional matrix space, it is important to bring the staged raw matrix into a format that preserves the two dimensional locality of matrix elements in memory. Obviously, locality is not well preserved for the widely used row-major and column-major layouts: two elements that are placed in the same column and in neighboring rows of an n×n row-major matrix have a distance of $n \cdot S_d$ bytes in memory (and equivalently two adjacent elements in one row in the memory layout of a column-major matrix). Hence, column (or row) reads result in a strided memory access throughout the complete memory segment of the matrix, which is obviously bad for locality-aware algorithms that process data in two dimensional space.

Instead, some embodiments described herein may use an algorithm that recurses on two-dimensional quad-trees by using a storage layout that preserves locality in both dimensions. Therefore, all elements of the matrix may be re-ordered according to a space-filling curve. This technique is inspired from indices for spatial or multidimensional data, such as in Hilbert R-trees or UB-trees. Besides the Hilbert-curve, there are several space-filling curves that provide a quad-tree ordering, and many are equally suited for the recursive method. Some embodiments may use the Z-curve, or Morton order, since the Z-value can be efficiently computed with bit interleaving. The locality of two matrix elements is effectively preserved within one quadrant, which is an internal node of the quad-tree. This property is recursive, such that the four child quadrants of any node are always stored consecutively in memory, as illustrated in FIGS. 4B and 4C. Note that the quadrant dimensions may be aligned two a power of two, since with each recursion the quadrant covers exactly ¼ of the parent area. In order to compute the minimal square Z-space that is required to cover the complete matrix with a Z-curve, both matrix dimensions are logically padded to the next largest common power of two. This results in a Z-space size of $K=4^{max\{\lceil log_2 m\rceil,\lceil log_2 n\rceil\}}$.

FIG. 5 is a recursive quad-tree algorithm 500 that may identify sparse and dense submatrices according to some embodiments. In particular, the algorithm is associated with a recursive partitioning routine, which takes the Z-ordered source matrix, the adaptive tile matrix target, two Z coordinates, and the buffer array ZBlockCnts[ ] as arguments. The latter stores the number of non-zero elements of each atomic block $b_{atomic} \times b_{atomic}$, and is pre-calculated using a single pass over the source matrix. As mentioned before, the atomic block dimensions are aligned to a power of two to match the recursive partitioning routine. The resulting ZBlockCnts array is also Z-ordered, but due to the blocking, the initial Z-space of size K is reduced by the factor of $b_{atomic}^2$ (FIG. 4C), and the recursion depth by a factor of $log_2 b_{atomic}$ The algorithm 500 recurses on the ZBlockCnts array by using the Z-coordinates zStart and zEnd. The sub-ranges in-between zStart and zEnd determine the Upper-Left ("UL"), Upper-Right ("UR"), Lower-Left ("LL") and Lower-Right ("LR") sub-square of the corresponding recursion step in the Z-space (lines 11-14). The anchor is reached when range is zero (line 3) and the sub-squares have the minimal block size. In the bottom-up recursion path, it is checked if all four neighboring blocks are homogenous—i.e., if all of them are of the same type, and neither of the two maximum block criteria is met. If so, the homogenous blocks are logically melted into a four times larger block, which is then returned (forwarded) to the recursion level above. If there are neighboring blocks of different density types at any recursion level, then each of the four corresponding blocks is materialized into either a sparse or a dense matrix tile (line 18). Depending on the matrix shape and dimension, the padding of the Z-space can result in a few logical blocks in the ZBlockCnts array that are outside of the actual matrix bounds, like the lower row in FIG. 4C. However, these may be ignored in the recursion and do not contribute to the submatrix materialization. FIG. 4D sketches the resulting adaptive tile matrix from the algorithm 500 on the sample matrix of FIG. 4A.

Figure 6:
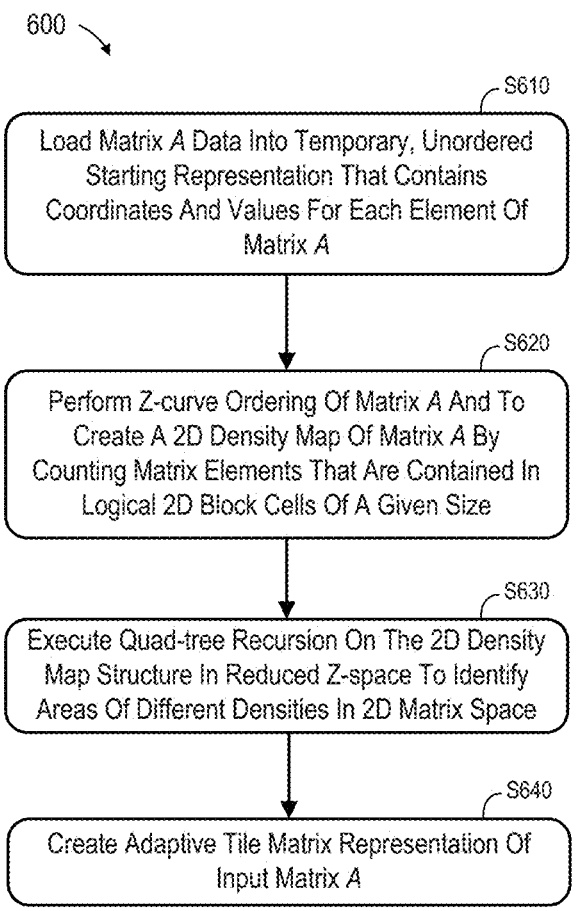
FIG. 6 is a flow diagram of a method according to some embodiments.

In some embodiments, various hardware elements of an adaptive tile matrix platform may execute program code to perform a method 600. The method 600 of FIG. 6 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software. Further note that the steps of the methods described herein may be performed in any order that is practical.

At S610, matrix A data is loaded into a temporary, unordered starting representation that contains coordinates and values for each element of matrix A. At S620, Z-curve ordering of matrix A is performed to create a two-dimensional density map of matrix A by counting matrix elements that are contained in logical two-dimensional block cells of a given size. Note that a maximum adaptive matrix tile size may be selected based at least in part on a size of a last level cache and a width of accumulator arrays used in a sparse matrix multiplication kernel. Moreover, the Z-curve ordering of matrix A may comprise a locality-aware element re-ordering. At S630, quad-tree recursion is executed on the two-dimensional density map structure in reduced Z-space to identify areas of different densities in the two dimensional matrix space.

Note that quadtree recursion may be performed on a buffer structure (e.g., ZCntBuffer in the algorithm) that contains the count of matrix elements for each logical block. It may be closely related to the "density map" since it may contain almost the same information. However, these two may comprise different structures, since the ZCntBuffer also contains entries for blocks that are outside of the actual matrix (due to the characteristic of the Z-ordering), whereas the density map only stores information for blocks that are really part of the matrix.

At S640, an adaptive tile matrix representation of input matrix A is created. The adaptive tile matrix representation may, for example, include adaptive tiles that store large sparse and dense matrices of an individual non-zero pattern, and tiles with lower densities may utilize a CSR format. According to some embodiments, dense tiles utilize an array representation. Note, however, that any of the embodiments described herein may be associated with other storage types (for sparse or dense tiles). In some embodiments, an adaptive tile matrix multiplication operation may be executed that performs dynamic tile-granular optimization based on density estimates and a cost model, and the adaptive tile matrix multiplication operation may utilize multiple sockets executing in parallel. According to some embodiments, the adaptive tile matrix representation is associated with big data stored in an in-memory column store and is used to determine a cosine similarity matrix for a plurality of electronic documents.

Note that the RAM complexity of the restructuring algorithm for a n×n matrix A with $N_{nz}^A$ elements is in $O(N_{nz}^A + K/b_{atomic}^2)$, plus the preceding Z-order sort in $O(N_{nz}^A \log N_{nz}^A)$. In contrast, the complexity of a sparse matrix-matrix multiplication C=A·A is given as $O(N_{nz}^A \sqrt{N_{nz}^C})$. Partitioning costs may be at least partially compensated by the performance gain of a single matrix multiplication. However, regarding hyper-sparse matrices where K is large and $N_{nz}^A$ is low, the atomic block size might be adjusted to assure that $K/b_{atomic}^2 \ll N_{nz}^A$, which reduces the overall partitioning costs.

Note that an aim of the heterogeneous tiling is to optimize the processing performance of large sparse matrices, with the focus on matrix multiplication. Unfortunately, it is difficult to judge the quality of the obtained partitioning for a single matrix, because the performance of a multiplication heavily depends on a second matrix (which is not known before runtime). Moreover, one aspect of the partitioning algorithm 500 is to decide if a given tile with density $\rho_{(ij)}$ should be treated as sparse or dense, which is part of the homogeneity check of the algorithm 500. In particular, it is determined if $\rho_{(ij)}$ exceeds a density threshold value $\rho_0$. The latter may be chosen according to an intersection of multiplication cost functions, at which the dense based algorithm starts to be more time-efficient as compared to the sparse algorithm. Since the costs are not only dependent on the second matrix density, but also on the system configuration, $\rho_0$ may be considered the second adaptable tuning parameter (with $b_{atomic}$ being the first).

Depending on the actual characteristics of the second matrix tile at runtime, the threshold $\rho_0$ might be far off the real turning point of the cost functions. In this case, the matrix tile might not be present in the optimal representation. Nevertheless, such a situation may be detected by the runtime multiplication optimizer of adaptive tile matrix multiplication, which can trigger a tile conversion from a sparse to a dense representation (or vice versa) at runtime. In the worst case, every matrix tile is later converted into another representation.

The memory consumption of the adaptive tile matrix can be either lower or higher as compared to that of a pure sparse matrix representation, but is always lower than a plain dense array. The worst case exists when all tiles have densities slightly above $\rho_0$. In this case, the matrix would be stored as dense, consuming $S_d/(\rho_0 S_{sp})$ as much memory as the sparse representation (e.g., a maximum 2.8 times in some embodiments).

Note that an adaptive tile matrix multiplication operator may support three independent operand types for the following: left input A, right input B and output matrix C→C' of the equation C'=C+A·B. Each matrix type can be one of the following: a plain matrix structure such as dense arrays or sparse CSR matrices, as they are commonly used in numerical algebra libraries, or a heterogeneous adaptive tile matrix. The latter provides a performance improvement by a cost-based optimization of tile-multiplications, and just-in-time transformations.

Figure 8:
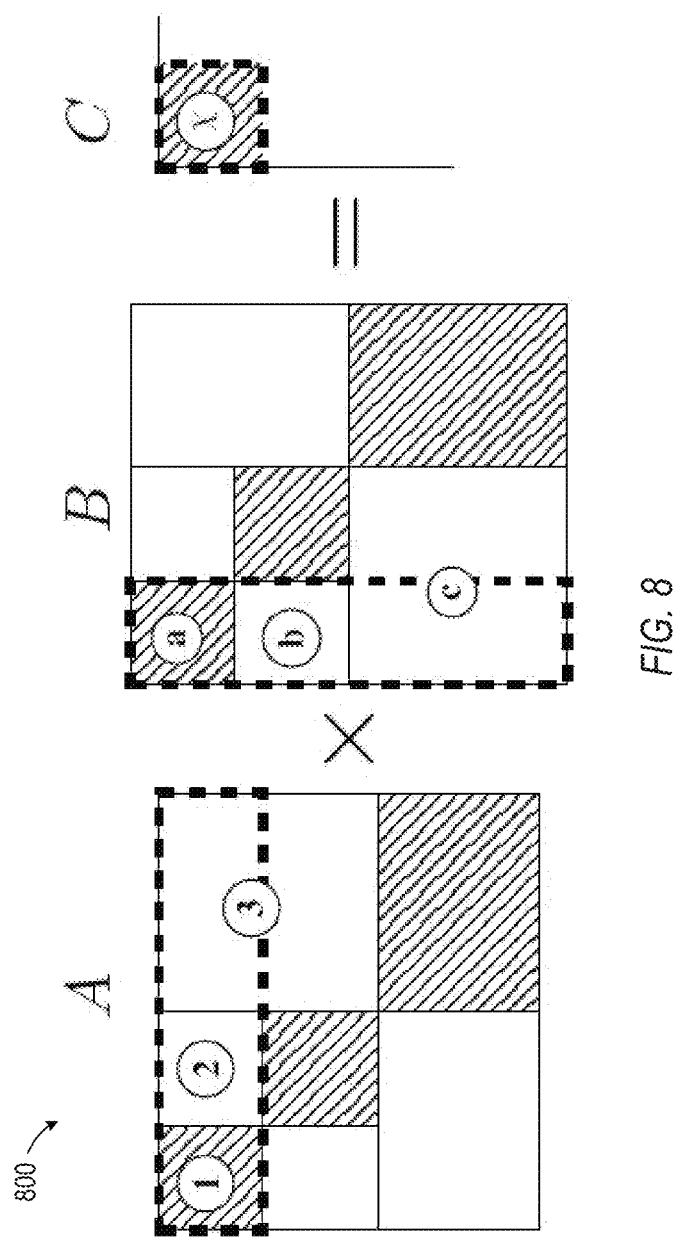
FIG. 8 illustrates referenced submatrix multiplication in accordance with some embodiments.

FIG. 7 is a sequential version of an adaptive tile matrix multiplication operation algorithm 700 in accordance with some embodiments. For illustrational purposes, the sequential version of adaptive tile matrix multiplication will be described, and the parallelization will be addressed separately. In general, multiplications that involve one or more adaptive tile matrixes are internally processed as multiple mixed multiplications of dense or sparse matrix tiles in a block-wise manner. For example, FIG. 8 illustrates 800 a referenced submatrix multiplication in accordance with some embodiments.

The resulting matrix tile multiplications may then be processed by basic multiplication kernels. However, unlike naive block-wise matrix multiplication, one particularity of the adaptive tile matrix multiplication operator is that the matrix tiles may have different block sizes. This entails that some multiplications involve only the matching subpart of a matrix tile, since a matrix multiplication is only defined for matrices with a matching contraction (inner) dimension k. In the illustration 800 of FIG. 8, the matrix tile $C_{(x)}$ results from the accumulation of three tile-multiplications $A_1B_a$, $A_2B_b$, and $A_3B_c$. However, for the latter only the upper half of tile $A_{(3)}$ is multiplied with the left half of tile Bo. We denote this operation as referenced submatrix multiplication.

Some embodiments described herein may provide improved processing of tiled matrix multiplication (as opposed to the particularities of low level algorithms of the multiplication kernels), since sparse and dense matrix multiplication kernels are continuously improved and tuned for modern hardware. The adaptive tile multiplication approach may act in the layer above the kernels, which are merely invoked in form of multiplication tasks in the algorithm 700 (line 10). The optimization may be decoupled from the implementations, given that the cost functions of all kernels are known to the optimizer. Hence, the ability to use existing high performance libraries as multiplication kernels may be kept wherever possible. Therefore, embodiments described herein might use only common matrix representations, such as arrays or CSR, so that the approach can benefit from a broad variety of libraries, which provide efficient implementations for the corresponding kernels. Thus, new algorithms from the high performance community that are based on the same basic data structures can simply be plugged in to the system.

Nevertheless, for some of the multiplication kernels many high performance libraries such as IntelMKL offer no reference implementation, for example for a dense×sparse→dense multiplication. In total, there are $2^3=8$ different kernels for the basic matrix types that are either sparse or dense. To achieve a better predictability of multiplication costs, embodiments might be implemented all sparse multiplication kernels themselves, using shared-memory parallel implementations based on the sparse accumulator approach. The latter is inspired from the classical row-based CSR algorithm, but used analogously in many column-based CSC algorithm implementations.

The ability to multiply only certain subparts of matrix tiles might be considered a basic building block of adaptive tile multiplication. Arbitrary rectangular subparts can be referenced via four coordinates, namely the coordinates of the upper left edge ($x_{ul}$, $y_{ul}$) and the coordinates of the lower right edge ($x_{lr}$, $y_{lr}$), which are both relative to the upper left end of the matrix tile (0, 0). In the algorithm 700, the referenced coordinates are contained in the reference window w.

Note that the implementation of referencing in the multiplication kernels may not be too intrusive, in particular for dense matrix multiplications: the BLAS function interface gemm (general matrix multiply) already distinguishes between the embracing array size (that could differ from the actual matrix dimensions) by providing the additional parameters lda, ldb, and ldc (leading array dimension in A, B and C). In this case, the only adaption added is the transformation of the submatrix coordinates into an offset that points to the beginning of the matrix in the array, and passing the respective lda and ldb to the gemm kernel.

For sparse kernels, referencing subranges in the row dimension is equally straightforward, since matrix rows in the CSR representation are indexed. In contrast, matrix elements are not index-addressable in the column direction, which complicates the adaption of the sparse multiplication kernel to process column ranges. Some embodiments may alter the row-based algorithm to process only the column indices that are contained in the referenced row range. To avoid undesired column range scans, embodiments may sort the elements in each row by column identifier at creation time to enable binary column identifier search. Moreover, the number of nonzero elements in a sparse block size $b_{max}^{sp}$ is restricted, which limits the maximal row width.

Each of the mentioned kernel functions may have a different runtime behavior that is reflected by a comprehensive cost model. The runtime of each kernel may depend on the dimensions m×k of matrix A, k×n of matrix B, the densities $\rho_A$, $\rho_B$, $\rho_C$ of both input and the potentially non-empty target matrix, as well as the estimated result density $\hat{\rho}_C$. A common situation is that some matrix tile, or even a subpart of a matrix tile, exceeds a characteristic density threshold $\rho_0 < 1$ of the cost model. In this situation, it might be beneficial to convert the respective part into a dense representation prior to the multiplication operation. Hence, the optimizer dynamically converts the input matrix representations whenever it leads to a reduction of the multiplication runtime for the respective part multiplication (line 9 in the algorithm 700).

In contrast to a single multiplication operation, the target tile $C_{(x)}$ (in FIG. 8) is written accumulatively in multiple tile-multiplications (i.e., in each multiplication of the corresponding block-row $A_1B_a$, $A_2B_b$ and $A_3B_c$). Hence, the physical representation of a $C_{(x)}$ tile is selected according to its final density, which is taken from the density estimate $\hat{\rho}_{C_{(x)}}$. However, in a database system there are usually some operational Service Level Agreements ("SLAs") to meet, such as a restriction of the total memory consumption. Obviously, storing a rather sparse result matrix in a dense array is in many cases an excessive waste of memory that should be avoided, even when the cost-based optimization might decide to do so. Therefore, embodiments may employ a flexible density threshold depending on the desired memory space limit of the target matrix (line 3 of the algorithm 700). This resource flexibility might sacrifice performance in favor of lower memory consumption.

There are several reasons for having a prior estimate of the block-density structure of the result matrix, and they are barely different from the motivation of cardinality estimation for relational join processing: first, the optimizer's decision naturally depends on the output density, which is a relevant parameter in the cost model of sparse multiplication kernels. Second, knowing the result density may be important for memory resource management, which includes memory restrictions that also effect the choice of data representations in the optimizer, e.g. in order to avoid out-of-memory situations. However, the exact non-zero structure can only be found through the actual execution of the multiplication. Therefore, embodiments may make use of a density estimation procedure based on probability propagation to obtain an estimate at negligible runtime cost compared to the actual multiplication. The density estimator takes the density maps of the input matrices A and B and returns a density map estimate of the resulting matrix C.

The density map $\rho_A$ of an m×n sparse matrix A is effectively $$a \frac{m}{b_{atomic}} \times \frac{n}{b_{atomic}}$$

density histogram. It consists of:

$$\left( \left\lceil \frac{m}{b_{atomic}} \right\rceil \cdot \left\lceil \frac{n}{b_{atomic}} \right\rceil \right)$$

scalar density values $(\rho)_{ij}$, each referring to the density of the corresponding logical block $A_{ij}$ of size $b_{atomic} \times b_{atomic}$ in matrix A. For example, FIG. 4C shows the density map of A, the creation of which is piggybacked to the tile partitioning process.

Before proceeding with the full density map estimation, note that the scalar density evolves in a single multiplication of two minimal $b_{atomic} \times b_{atomic}$ blocks. It might be assumed that, at a block level, the density distribution within one block is approximately uniform. Hence, the non-zero probability of a randomly picked element (pq) in a logical matrix block $A_{ij}$ may be $p((A_{ij})_{pq} \neq 0) = \rho_{ij}$. In this case:

Statement I. Given that the non-zero elements are uniformly distributed, the density estimate $\hat{\rho}$ of a product Z of two logical matrix blocks $Z = X \cdot Y$ can be calculated using probabilistic propagation as:

$$\hat{\rho}_Z = \rho_X \cdot \rho_Y = 1 - (1 - \rho_X \rho_Y)^{b_{atomic}}$$

Note that this estimate may be unbiased, i.e., $E[\hat{\rho}_Z] = \rho_Z$. Statement I might use the inner product formulation, the elements $z_{ij}$ of the result block are calculated as $\rho_k x_{ik} y_{kj}$. The probability for $x_{ik}$ being non-zero is $p(x_{ik} \neq 0) = \rho_X$, for $y_{kj}$ accordingly: $p(y_{kj} \neq 0) = \rho_Y$. Thus, every summand $x_{ik} y_{kj}$ is non-zero with probability $p_{nz}(x_{ik}) \wedge p_{nz}(y_{kj}) = \rho_X \rho_Y$. $z_{ij}$ is non-zero if any of the summands $x_{ik} y_{kj}$ is non-zero. In addition, the inverse probability may be leveraged to obtain $p(z_{ij} = 0) = \Pi_k (1 - \rho_X \rho_Y)$. Finally, with $p(z_{ij} \neq 0) = 1 - p(z_{ij} = 0)$ and $p(z_{ij} \neq 0) = \rho_Z$, the above equation for $\rho_Z$ results.

Note that some approaches may assume no cancellation, i.e., a sum of products of overlapping non-zero elements never cancels to zero, which is a common assumption in the mathematical programming literature. For the sake of simplicity, one may denote the operation above for $\hat{\rho}_Z$ with the "$\odot$" symbol, thus, $\rho_C = \rho_A \odot \rho_B$.

The following demonstrates how the complete density map $\rho_C$ of the result matrix C is estimated from the density maps $\rho_A$ and $\rho_B$ of its factor matrices. As an example, consider two density maps each consisting of 2×2 logical blocks:

$$\rho_A = \begin{pmatrix} \rho A_{11} & \rho A_{12} \\ \rho A_{21} & \rho A_{22} \end{pmatrix}, \rho_B = \begin{pmatrix} \rho B_{11} & \rho BA_{12} \\ \rho B_{21} & \rho BA_{22} \end{pmatrix}$$

At first, it is worthwhile to take a glance at blocked matrix multiplication. Assuming square blocks, the product matrix C can be represented as:

$$C = \begin{pmatrix} A_{11} \cdot B_{11} + A_{12} \cdot B_{21} & A_{11} \cdot B_{12} + A_{12} \cdot B_{22} \\ A_{21} \cdot B_{11} + A_{22} \cdot B_{21} & A_{21} \cdot B_{12} + A_{22} \cdot B_{22} \end{pmatrix}$$

First, define an estimator for the addition of two matrices:

Statement II. Given that the non-zero elements are uniformly distributed, the density estimate $\hat{\rho}$ of the addition of two matrices $Z = X + Y$ can be calculated using probabilistic propagation:

$$\hat{\rho}_{X+Y} = \rho_X + \rho_Y - (\rho_X \rho_Y) = \rho_X \oplus \rho_Y$$

Then, combining the above, the following may be obtained:

$$\hat{\rho}_C = \begin{pmatrix} \rho A_{11} \odot \rho B_{11} \oplus \rho A_{12} \odot \rho B_{21} & \rho A_{11} \odot \rho B_{12} \oplus \rho A_{12} \odot \rho B_{22} \\ \rho A_{21} \odot \rho B_{11} \oplus \rho A_{22} \odot \rho B_{21} & \rho A_{21} \odot \rho B_{12} \oplus \rho A_{22} \odot \rho B_{22} \end{pmatrix}$$

for the density propagation of a 2×2 map. Density maps of a finer granularity, i.e. with more than four blocks, are calculated accordingly.

As a matter of fact, the smaller the block size and the higher the granularity, the more information is stored in the density map, and finer structures can be resolved. However, the runtime of the density map estimation also grows with the granularity, since its complexity is in $O((n/b_{atomic})^3)$. Thus, the block size configuration is generally a trade-off between accuracy and runtime of the prediction. However, the fraction of the density estimation did not exceed 5% of the total multiplication runtime in some embodiments.

Figure 9:
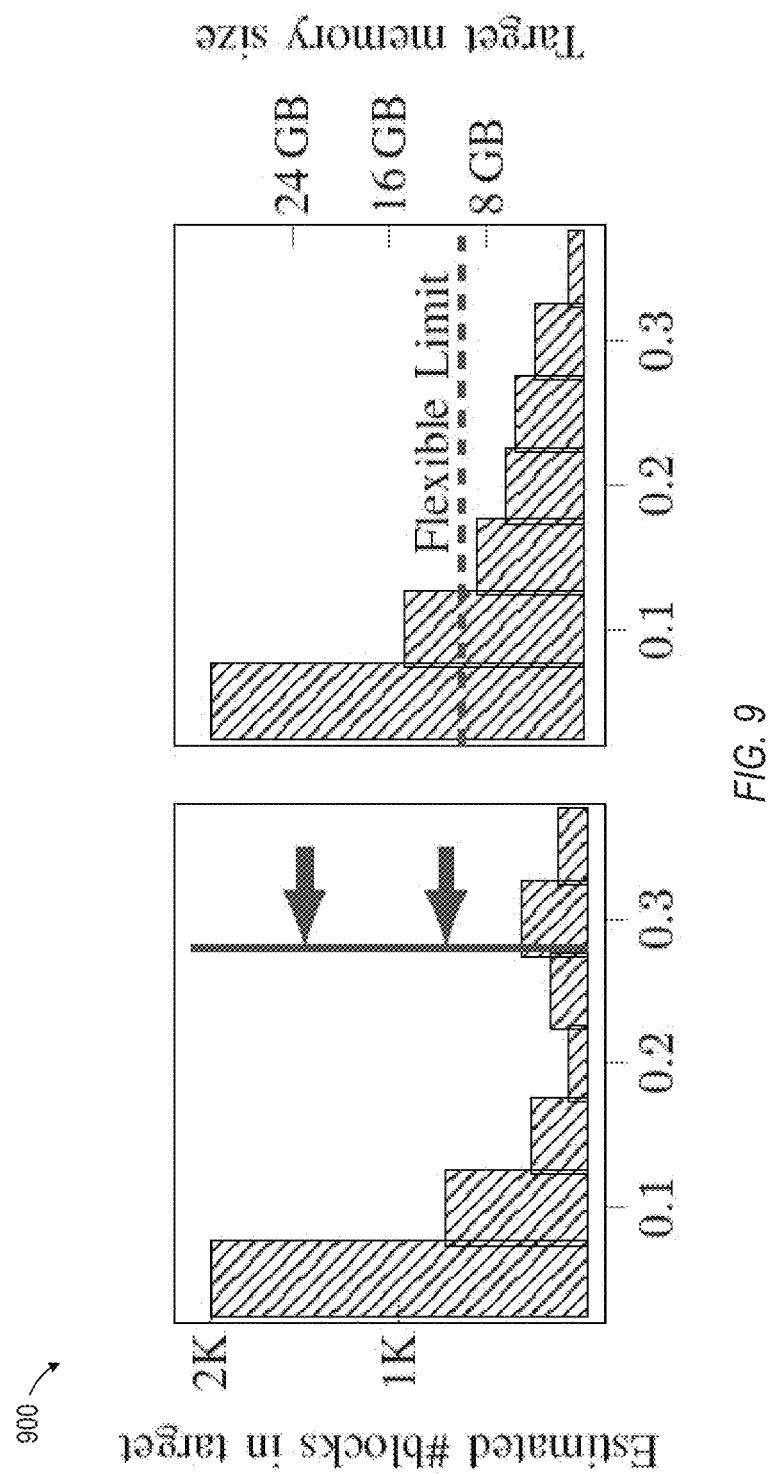
FIG. 9 is a one-dimensional histogram of logical block densities according to some embodiments.

In order to determine the common local density threshold $\rho_D$ for target tiles that are in synchronization with the flexible memory consumption limit for the total matrix, embodiments may employ a "water level method" that works on the density map estimate $\hat{\rho}_C$ described above (line 3 in the algorithm 700): consider $\hat{\rho}_C$ as a two dimensional histogram with a density bar $\rho_{ij}$ for each logical matrix ($b_{min} \times b_{min}$) block (ij)—the higher the density $\rho_{ij}$ of block (ij), the higher its bar in the histogram. The idea is to start with a high water level that covers all bars in the two-dimensional histogram. If the water level is lowered, the blocks with the highest density bars will be "visible" first—hence, storing these blocks as dense is most promising with regard to the potential performance improvement. The level will be continuously lowered until the accumulated memory consumption of all dense and sparse blocks hits the memory limit. The method can easily be transformed from two-dimensional space into a one-dimensional space, as shown 900 in FIG. 9. Instead of a 2D-histogram, a 1D histogram is created that displays the absolute number of logical blocks per density bin $\rho_j$. Lowering the water level can be imagined as a sliding horizontal line (the left portion of FIG. 9) from the right to the left histogram side. All blocks to the right of the line contribute with dense block size $BS^D$ to the memory consumption, whereas all blocks to the left of the line only with the size of the sparse representation $\rho_i \cdot C_1 \cdot BS^D$. The constant factor $C_1$ resembles the additional storage that is required for the element coordinates in CSR (approximately 2). The resulting density threshold equals the intersection of the accumulated histogram (the right portion of FIG. 9) with the flexible memory limit (illustrated as a dashed line in FIG. 9).

Figure 10:
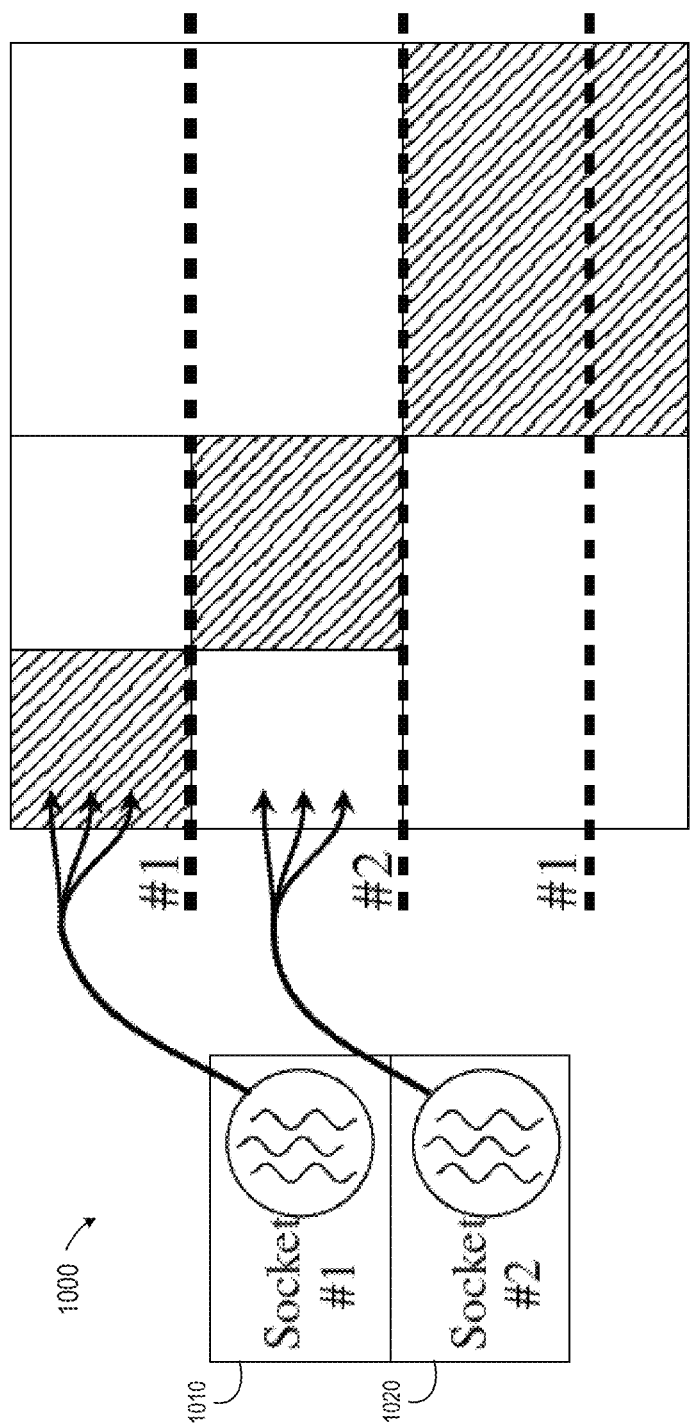
FIG. 10 illustrates parallel resource distribution and matrix partitioning in a non-uniform memory access two-socket system in accordance with some embodiments.

Some implementations of the adaptive tile multiplication algorithm 700 may be parallelized by forming pairs (ti, tj) of tile-rows of matrix A and tile-columns of matrix B. Each pair represents an independent task that writes a target tile $C_{ti,tj}$ in the result matrix, and multiple of these tasks can be run in parallel. Moreover, all multiplication kernels in adaptive tile multiplication are internally parallelized. As a result, there are two levels of parallelization: the intra-tile parallelization and inter-tile parallelization. For example, FIG. 10 illustrates parallel resource distribution and Non-Uniform Memory Access partitioning 1000 on a two-socket system 1010, 1020 in accordance with some embodiments. Note that on modern multi-core machines, the RAM is distributed across multiple sockets 1010, 1020 that contain one or more processors each, leading to the effects of NUMA. To reduce remote accesses, matrices may be distributed across the memory nodes as part of the partitioning process: matrix $A_{ti}$ tile-rows are distributed round-robin-wise, and matrix $B_{tj}$ tile-columns are randomly distributed. The worker threads of adaptive tile matrix multiplication may be pinned to the socket of the respective $A_{ti}$ tile-row. Since the worker threads dynamically allocate the target tiles in $C_{ti,tj}$ and due to the Linux first touch policy, C effectively inherits the tile-row memory distribution scheme from matrix A. Some implementations might use a job executor task scheduling framework, such as the one used in the SAP HANA® database (which offers options to pin tasks to CPU cores and memory nodes).

Figure 11:
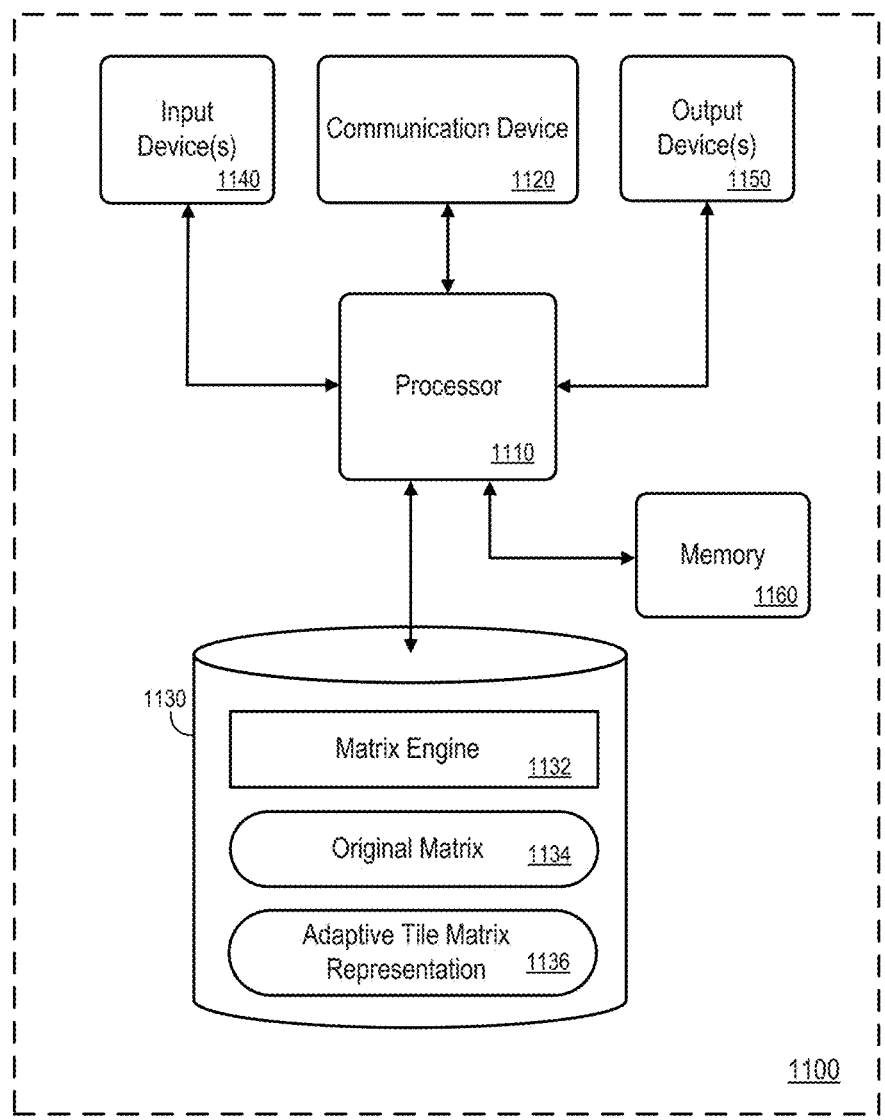
FIG. 11 is a block diagram of an adaptive tile matrix platform according to some embodiments.

Note that embodiments of an adaptive tile matrix platform may be implemented in any of a number of different ways. For example, FIG. 11 is a block diagram of an adaptive tile matrix platform apparatus 1100 according to some embodiments. The apparatus 1100 may comprise a general-purpose computing apparatus and may execute program code to perform any of the functions described herein. The apparatus 1100 may include other unshown elements according to some embodiments.

The apparatus 1100 includes a processor 1110 operatively coupled to a communication device 1120, a data storage device 1130, one or more input devices 1140, one or more output devices 1150, and a memory 1160. The communication device 1120 may facilitate communication with external devices, such as a reporting client, a data storage device, or elements of a computer system being monitored. The input device(s) 1140 may comprise, for example, a keyboard, a keypad, a mouse or other pointing device, a microphone, knob or a switch, an Infra-Red ("IR") port, a docking station, and/or a touch screen. The input device(s) 1140 may be used, for example, to enter information into apparatus 1100 such as matrix multiplication kernels, tuning parameters, report generation requests, etc. Note that that matrix multiplication kernels might not be programmed directly by an end user, but rather be provided as part of a software package (e.g., "MatrixEngine")—and might be adapted by the administrator of the MatrixEngine. The output device(s) 1150 may comprise, for example, a display (e.g., a display screen) a speaker, and/or a printer to output monitoring data history reports.

The data storage device 1130 may comprise any appropriate persistent storage device, including combinations of magnetic storage devices (e.g., magnetic tape, hard disk drives and flash memory), optical storage devices, Read Only Memory ("ROM") devices, etc., while the memory 1160 may comprise RAM.

A matrix engine 1132 may comprise program code executed by processor 1110 to cause apparatus 1100 to perform any one or more of the processes described herein. According to some embodiments, matrix engine compiled machine code may reside on a disk and a matrix engine executable file may then be loaded into program memory (RAM) when the program is started by the Operating System. Embodiments are not limited to execution of these processes by a single apparatus. An original matrix 1134 and/or an adaptive tile matrix representation 1136 may be stored, for example, in a columnar database. The data storage device 1130 may also store data and other program code for providing additional functionality and/or which are necessary for operation of apparatus 1100, such as device drivers, operating system files, etc.

Figure 12:
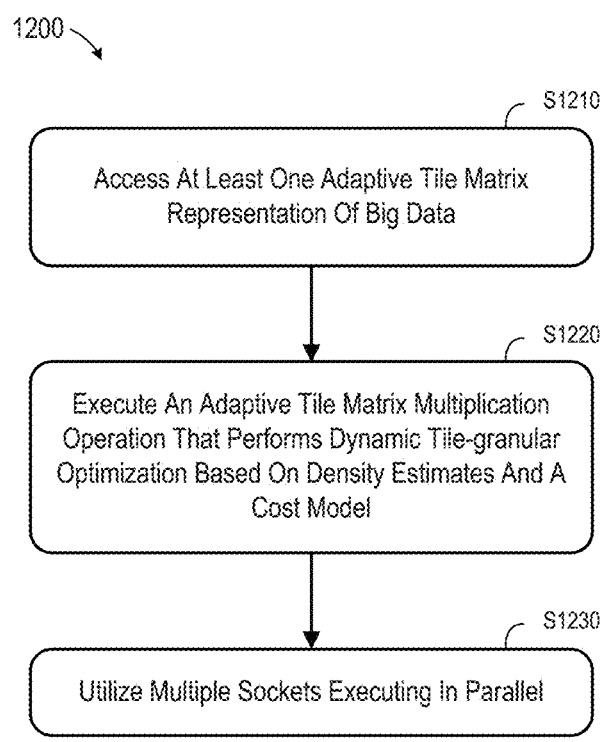
FIG. 12 is a flow diagram of an adaptive tile matrix multiplication operation method according to some embodiments.

According to some embodiments, the matrix engine 1132 may perform a method 1200 such as the illustrated in FIG. 12. In particular, at S1210 the matrix engine 1132 may access at least one adaptive time matrix representation of big data. As S1220, an adaptive tile matrix multiplication operation may be executed that performs a dynamic tile-granular optimization based on density estimates and a cost model At S1230, multiple sockets executing in parallel may be utilized to further improve system performance.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer processing system, comprising:
   an in-memory column store containing big data analytic information;
   a real-time analytics, interactive data exploration and application platform coupled to the in-memory column store;
   a communication device coupled to the real-time analytics, interactive data exploration and application platform to receive a raw input matrix A associated with the big data analytic information contained in the in-memory column store; and
   an adaptive tile matrix engine, coupled to the communication device, including:
      a memory storing processor-executable program code, and
      a multi-core computer processor to execute the processor-executable program code in order to cause the adaptive tile matrix engine to:
         load matrix A data into a temporary, unordered starting representation that contains coordinates and values for each element of matrix A,
         perform Z-curve ordering of matrix A and create a two-dimensional density map of matrix A by counting matrix elements that are contained in logical two-dimensional block cells of a given size,
         execute a quad-tree recursion on the two-dimensional density map structure in reduced Z-space to identify areas of different densities in the two dimensional matrix space,
         create an adaptive tile matrix representation of input matrix A,
         execute an adaptive tile matrix multiplication operation that performs dynamic tile-granular optimization based on density estimates and a cost mode, wherein the adaptive tile matrix multiplication operation utilizes multiple sockets of the multi-core computer processor executing in parallel, and
         transmit an indication of a result of said adaptive tile matrix multiplication operation to the real-time analytics, interactive data exploration and application platform.

2. The system of claim 1, wherein the adaptive tile matrix representation includes adaptive tiles that store large sparse and dense matrices of an individual non-zero pattern.

3. The system of claim 2, wherein tiles with lower densities utilize a compressed sparse row format.

4. The system of claim 1, wherein a maximum adaptive matrix tile size is selected based at least in part on a size of a last level cache.

5. The system of claim 1, wherein a maximum adaptive matrix tile size is selected based at least in part on a width of accumulator arrays used in a sparse matrix multiplication kernel.

6. The system of claim 1, wherein the Z-curve ordering of matrix A comprises a locality-aware element re-ordering.

7. The system of claim 1, wherein the adaptive tile matrix representation is used to determine a cosine similarity matrix for a plurality of electronic documents.

8. A computer-implemented method, comprising:
   accessing, by a real-time analytics, interactive data exploration and application platform, big data analytic information contained in an in-memory column store;
   loading matrix A data into a temporary, unordered starting representation that contains coordinates and values for each element of matrix A, wherein matrix A is associated with the big data analytic information;
   performing, by a multi-core computer processor of an adaptive tile matrix engine, Z-curve ordering of matrix A to create a two-dimensional density map of matrix A by counting matrix elements that are contained in logical two-dimensional block cells of a given size;
   executing, by the multi-core computer processor of the adaptive tile matrix engine, quad-tree recursion on the two-dimensional density map structure in reduced Z-space to identify areas of different densities in the two dimensional matrix space;
   creating an adaptive tile matrix representation of input matrix A;
   executing an adaptive tile matrix multiplication operation that performs dynamic tile-granular optimization based on density estimates and a cost mode, wherein the adaptive tile matrix multiplication operation utilizes multiple sockets of the multi-core computer processor executing in parallel; and
   transmitting an indication of a result of said adaptive tile matrix multiplication operation to the real-time analytics, interactive data exploration and application platform.

9. The method of claim 8, wherein the adaptive tile matrix representation includes adaptive tiles that store large sparse and dense matrices of an individual non-zero pattern.

10. The method of claim 9, wherein tiles with lower densities utilize a compressed sparse row format.

11. The method of claim 8, wherein a maximum adaptive matrix tile size is selected based at least in part on a size of a last level cache and a width of accumulator arrays used in a sparse matrix multiplication kernel.

12. The method of claim 8, wherein the Z-curve ordering of matrix A comprises a locality-aware element re-ordering.

13. The method of claim 8, wherein the adaptive tile matrix representation is associated with big data stored in an in-memory column store and is used to determine a cosine similarity matrix for a plurality of electronic documents.

* * * * *